US012020672B2

(12) United States Patent
Onishi et al.

(10) Patent No.: US 12,020,672 B2
(45) Date of Patent: Jun. 25, 2024

(54) AUDIO EQUIPMENT

(71) Applicant: AlphaTheta Corporation, Yokohama (JP)

(72) Inventors: Kenji Onishi, Yokohama (JP); Mitsunobu Ito, Yokohama (JP); Shimpei Aso, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 907 days.

(21) Appl. No.: 16/977,230

(22) PCT Filed: Mar. 1, 2018

(86) PCT No.: PCT/JP2018/007728

§ 371 (c)(1),
(2) Date: Sep. 1, 2020

(87) PCT Pub. No.: WO2019/167217

PCT Pub. Date: Sep. 6, 2019

(65) Prior Publication Data

US 2021/0012759 A1 Jan. 14, 2021

(51) Int. Cl.

*G10H 1/053* (2006.01)
*G10K 15/04* (2006.01)
*G10K 15/08* (2006.01)

(52) U.S. Cl.

CPC ............. *G10H 1/053* (2013.01); *G10K 15/04* (2013.01); *G10K 15/08* (2013.01)

(58) Field of Classification Search

CPC ......... G10K 15/08; G10K 15/04; G10H 1/053
See application file for complete search history.

(56) References Cited

U.S. PATENT DOCUMENTS

2010/0216547 A1* 8/2010 Coppard ............. A63F 13/5375 463/31
2013/0123961 A1* 5/2013 Roman ................ G10H 1/0008 700/94

(Continued)

FOREIGN PATENT DOCUMENTS

JP 8-314451 11/1996
JP 2000-47664 2/2000

(Continued)

OTHER PUBLICATIONS

Japanese Office Action with English translation dated Aug. 17, 2021, 8 pages.

(Continued)

*Primary Examiner* — Forrest M Phillips
(74) *Attorney, Agent, or Firm* — Rankin, Hill & Clark LLP

(57) ABSTRACT

Audio equipment configured to perform a special operation or an effecting on music data being played by an external device includes: an operation control signal group storage configured to store an operation control signal group for commanding the special operation or the effecting for the music data; an operation control signal group calling section configured to call up the operation control signal group stored in the operation control signal group storage at a timing in accordance with an operation by an operator; and an operation control signal group outputting section configured to output the operation control signal group called by the operation control signal group calling section to the external device.

5 Claims, 4 Drawing Sheets

(56) References Cited

U.S. PATENT DOCUMENTS

| | | | | |
|---|---|---|---|---|
| 2014/0000440 | A1* | 1/2014 | Georges | G10H 7/00 84/609 |
| 2014/0225845 | A1* | 8/2014 | Muzar | G06F 3/041 345/173 |

FOREIGN PATENT DOCUMENTS

| | | | | |
|---|---|---|---|---|
| JP | 2002-328768 | | 11/2002 | |
| JP | 2014-204258 | | 10/2014 | |
| WO | WO-2007112421 | A2 * | 10/2007 | H04H 60/04 |
| WO | WO-2017059301 | A1 * | 4/2017 | G10H 1/0091 |
| WO | 2017/119115 | | 7/2017 | |

OTHER PUBLICATIONS

International Search Report dated Jan. 5, 2018, Application No. PCT/JP2018/007728, 4 pages.

English translation of International Preliminary Report on Patentability dated Sep. 1, 2020, Application No. PCT/JP2018/007728, 7 pages.

* cited by examiner

AUDIO EQUIPMENT

TECHNICAL FIELD

The present invention relates to audio equipment.

BACKGROUND ART

Typically, known MIDI sound source devices, many of which are to be connected to a device such as a personal computer or a sequencer in use, are difficult to take out or the like.

Accordingly, Patent Literature 1 discloses a sound source device including a memory configured to store sound data generated by a personal computer and a memory data playing unit configured to convert, in response to an operation by an operator, the stored sound data to an analog audio signal to be outputted.

Meanwhile, in a DJ equipment industry, a desire for a DJ performer to casually perform high-level techniques such as scratch operation, addition of an echo effect, and a loop playing operation has been strengthened for a variety of DJ performances.

CITATION LIST

Patent Literature(s)

Patent Literature 1 JP 8-314451 A

SUMMARY OF THE INVENTION

Problem(s) to be Solved by the Invention

However, the above technology described in Patent Literature 1, which merely causes sound data generated in MIDI data to be played as it is, is unlikely to allow the high-level techniques desired in the DJ industry to be performed.

An object of the invention is to provide audio equipment that allows for playing a high-level DJ performance.

Means for Solving the Problem(s)

Audio equipment according to an aspect of the invention configured to perform a special operation or an effecting on music data being played by an external device includes: an operation control signal group storage configured to store an operation control signal group for commanding the special operation or the effecting for the music data; an operation control signal group calling section configured to call up the operation control signal group stored in the operation control signal group storage at a timing in accordance with an operation by an operator; and an operation control signal group outputting section configured to output the operation control signal group called by the operation control signal group calling section to the external device.

Audio equipment according to another aspect of the invention configured to perform a special operation or an effecting on music data being played includes: a playing section configured to play the music data; an operation control signal group storage configured to store an operation control signal group for commanding the special operation or the effecting for the music data; an operation control signal group calling section configured to call up the operation control signal group stored in the operation control signal group storage at a timing in accordance with an operation by an operator; and an operation control signal group outputting section configured to output the operation control signal group called by the operation control signal group calling section to the external device.

BRIEF DESCRIPTION OF DRAWING(S)

DESCRIPTION OF EMBODIMENT(S)

Exemplary embodiments of the invention are described below with reference to the drawings.

[1] Overall Configuration of Music Data Playing Control System 1

Figure 1:
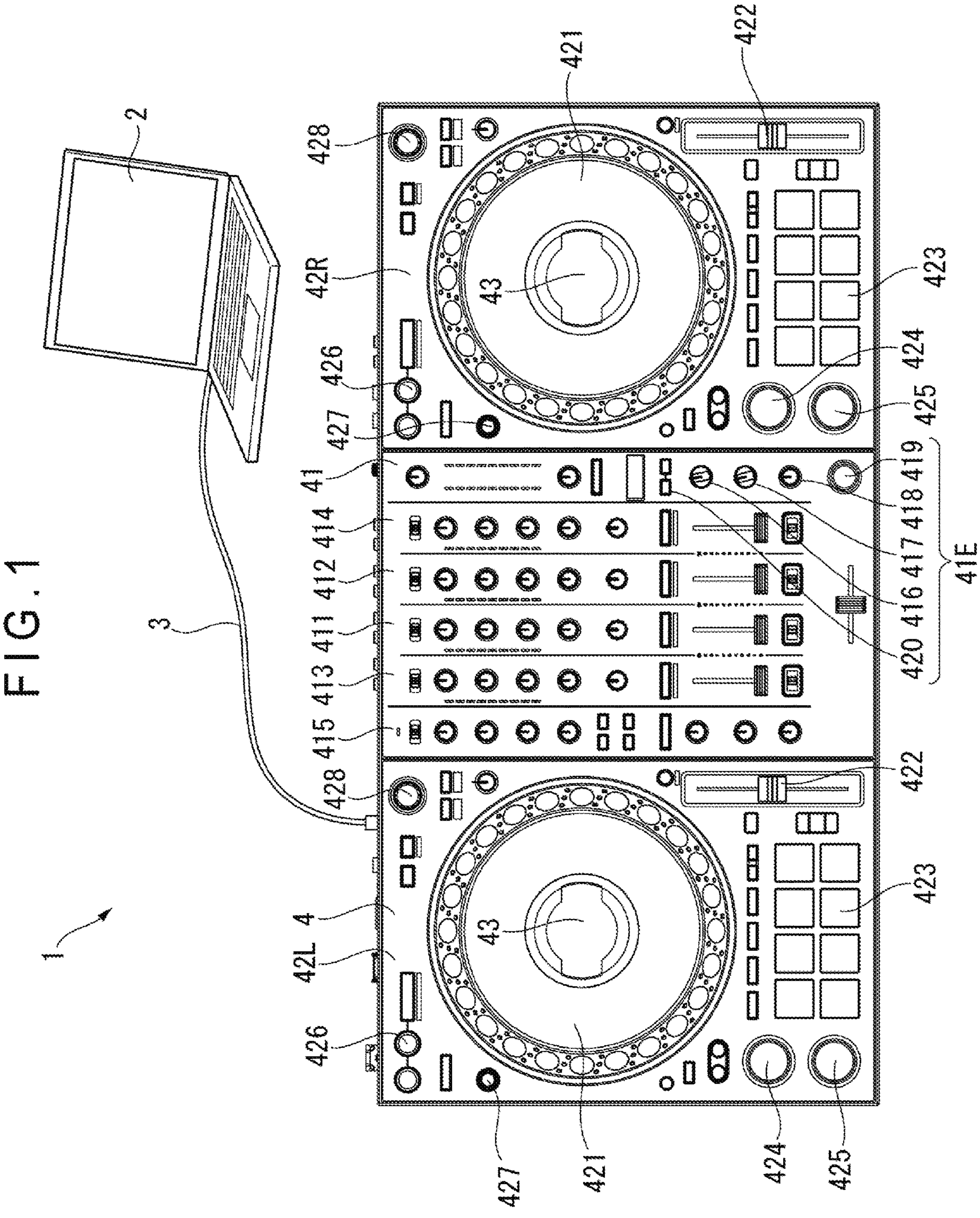
FIG. 1 is a schematic diagram showing a music data playing control system including audio equipment according to a first exemplary embodiment of the invention.

FIG. 1 shows a music data playing control system 1 according to a first exemplary embodiment of the invention. The music data playing control system 1 including a computer 2 and a DJ controller 4 connected to the computer 2 through a USB cable 3.

The computer 2, which includes CPU and a storage such as hard disk, is configured to play music data such as MP3 stored in the storage. The music data is played by music player application software run on the CPU and the played music data is outputted to the DJ controller 4 through the USB cable 3. Further, a play control signal generated by operating a mixer section 41 and deck sections 42L and 42R is outputted from the DJ controller 4 through the USB cable 3 to be inputted to the computer 2. The computer 2 performs a variety of special operations and a sound effecting in accordance with the playing control signal outputted from the DJ controller 4 on the music data being played.

The DJ controller 4, which is an example of the audio equipment, includes the mixer section 41 located at a center thereof and the deck sections 42L and 42R located at right and left of the mixer section 41. It is to be noted that the audio equipment according to the invention includes, in a concept, not only a sound playing controller as in the exemplary embodiment but also a sound player configured to play music data.

The mixer section 41, which is a section for operation to switch audio data outputted from the computer 2, adjust volumes of channels, and add a sound effect, includes first channel adjuster 411 to fourth channel adjuster 414 and a microphone adjuster 415.

An effecting section 41E is provided at a lower right of the mixer section 41. The effecting section 41E is provided to add an effect to the played music piece. The effecting section 41E, which will be described later in detail, includes an effect selection switch 416, a channel selection switch 417, an effect-amount adjusting switch 418, an effecting switch 419, and a beat changing switch 420.

The deck sections 42L and 42R, which are sections configured to be operated by an operator to give commands to add a variety of effects to the music data outputted from the computer 2, each include a jog dial 421, a tempo slider 422, a performance pad 423, a CUE button 424, a play/pause button 425, a loop button 426, a deck section selection button 427, and a load button 428.

The jog dial 421, which is an example of a rotary operation unit, is rotatably provided to a device body of each of the deck sections 42L and 42R, is configured to give a command for fast-forwarding or reversing music data to be played in response to the operator rotating the jog dial 421.

A display 43, which includes a liquid crystal display, is provided at a center of the jog dial 421. A BPM (Beats Per Minute) value, an elapsed time, a state of progress, and a beat position of the music data on play, and a state of rotation of an LP record at 33 RPM in accordance with the progress of the music data on play are displayed on the display 43, allowing the operator to visually check the progress of the playing of the music data.

The tempo slider 422 is a switch for adjusting a tempo of music data to be played. The performance pad 423, which is a button for switching an effect for the music data on play, is configured to add effects, such as loop, cue, key shift, and sampler, to the music data on play instantaneously when pressed by the operator.

The CUE button 424 is a button for cueing a music piece to be played.

The play/pause button 425 is a button for starting playing of music data and pausing the music data on play. The loop button 426 is a button for looping the music data on play.

The deck section selection button 427 is a button for selecting one of the first channel adjuster 411 to the fourth channel adjuster 414 of the mixer section 41 that is to be used for operating the music data on play. In the exemplary embodiment, the left deck section 42L is configured to switch between the first channel adjuster 411 and the third channel adjuster 413 and the right deck section 42R is configured to switch between the second channel adjuster 412 and the fourth channel adjuster 414.

The load button 428 is a button for loading music data from the computer 2. By pressing the load button 428 after music data to be played is selected on the computer 2, the music data is loaded to a channel corresponding to one of the first channel adjuster 411 to the fourth channel adjuster 414.

[2] Functional Block Configuration of DJ Controller 4

Figure 2:
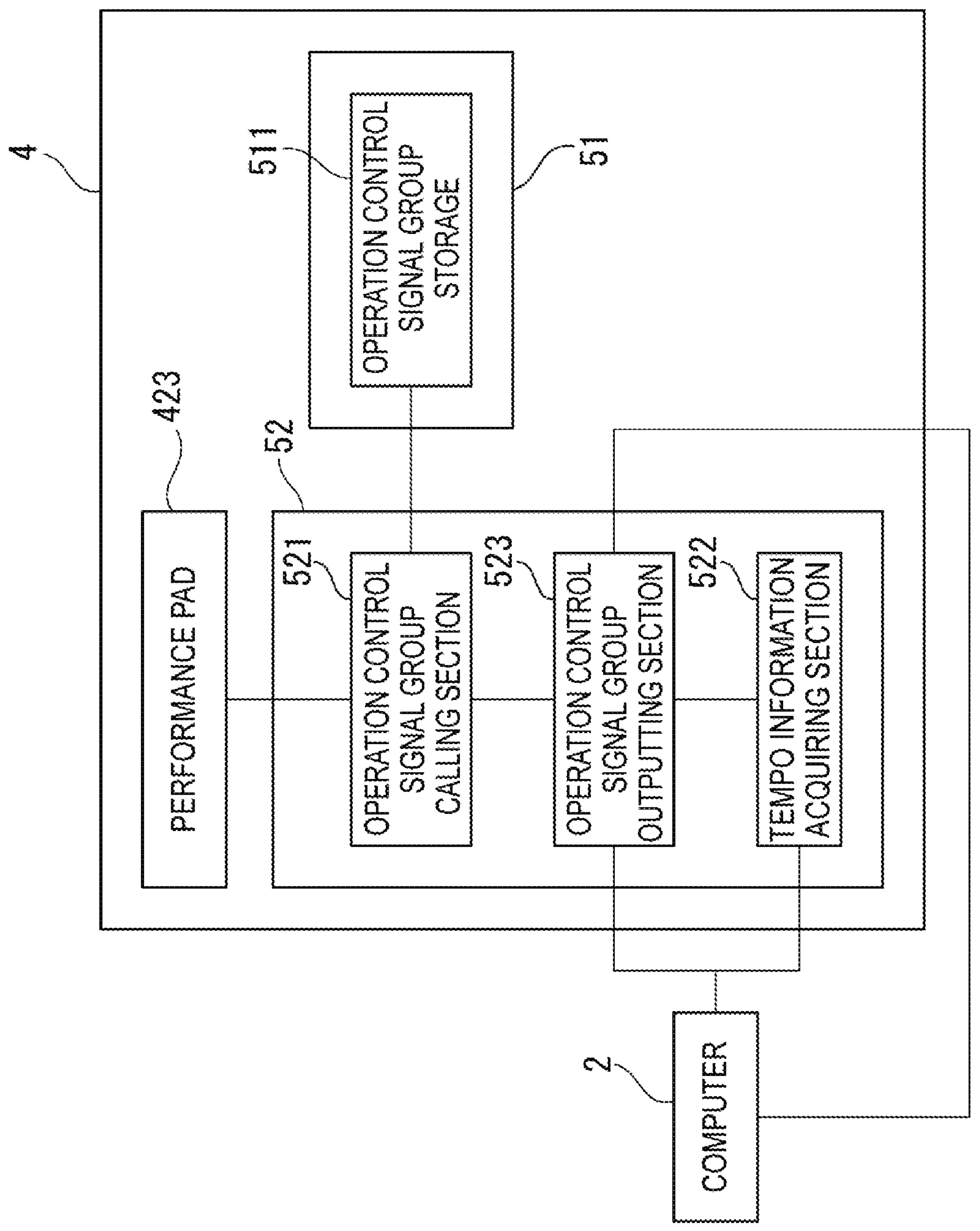
FIG. 2 is a functional block diagram showing a configuration of the audio equipment according to the exemplary embodiment.

FIG. 2 shows a functional block configuration of the DJ controller 4 according to the exemplary embodiment. The deck sections 42L and 42R of the DJ controller 4, each of which includes a memory 51 and a CPU (Central Processing Unit) 52, are configured to perform a special operation or effecting in accordance with an operation on the jog dial 421, the performance pad 423, the effecting section 41E, or the like when the deck sections 42L and 42R are operated by a DJ performer. The memory 51 includes an operation control signal group storage 511. The CPU 52 includes an operation control signal group calling section 521, a tempo information acquiring section 522, and an operation control signal group outputting section 523.

The operation control signal group storage 511 stores an operation control signal group including play style data of a specific individual. The operation control signal group includes play style data regarding scratch and loop operation performed with the deck sections 42L and 42R, effecting based on the settings of the effecting section 41E, and the like, and information about time for starting each piece of the play style data.

Specifically, the operation control signal group storage 511 stores special operations such as a scratch operation of the jog dial 421 performed by a famous DJ, an echo effect in which a frequency range of the music data is narrowed toward a higher-range or a lower-range, an effect of repeatedly playing a part of the music data such as a loop playing operation, and a high-speed rotary operation of swiftly rotating the jog dial 421.

The operation control signal group calling section 521 is configured to call up the operation control signal group stored in the operation control signal group storage 511 at a timing in accordance with an operation by an operator. Specifically, for instance, the performance pad 423 includes eight pads associated with respective operation control signal groups regarding DJ players being different from each other. The operation control signal group calling section 521 is configured to call up the operation control signal group of the corresponding DJ player onto the CPU 52 from the memory 51, when the operator hits one of the performance pads 423. The operation control signal group calling section 521 is configured to output the called operation control signal group to the operation control signal group outputting section 523.

The tempo information acquiring section 522 is configured to acquire tempo information regarding the music data on play. Specifically, the tempo information acquiring section 522 is configured to acquire the tempo information from a BPM (Beat Per Minute) value, a beat position, and the like analyzed by a music data analysis program run in the computer 2. It should be noted that the tempo information analyzed on the program run in the computer 2 is acquired in the exemplary embodiment; however, the invention is not limited thereto. The tempo information acquiring section 522 may analyze the inputted music data on play to acquire the tempo information. The tempo information acquiring section 522 is configured to output the acquired tempo information to the operation control signal group outputting section 523.

The operation control signal group outputting section 523 is configured to output the operation control signal group called up by the operation control signal group calling section 521 to the computer 2 (an external device) through the USB cable 3. Specifically, the operation control signal group outputting section 523 is configured to convert top data in the called operation control signal group into a MIDI code and send the MIDI-coded top data to the computer 2.

At this time, the operation control signal group outputting section 523 is configured to calculate a time interval until an output of next MIDI-coded data on a basis of the tempo information of the music data on play acquired by the tempo information acquiring section 522 and the top data of the time information in the operation control signal group.

[3] Workings and Effects of Exemplary Embodiment

Figure 3:
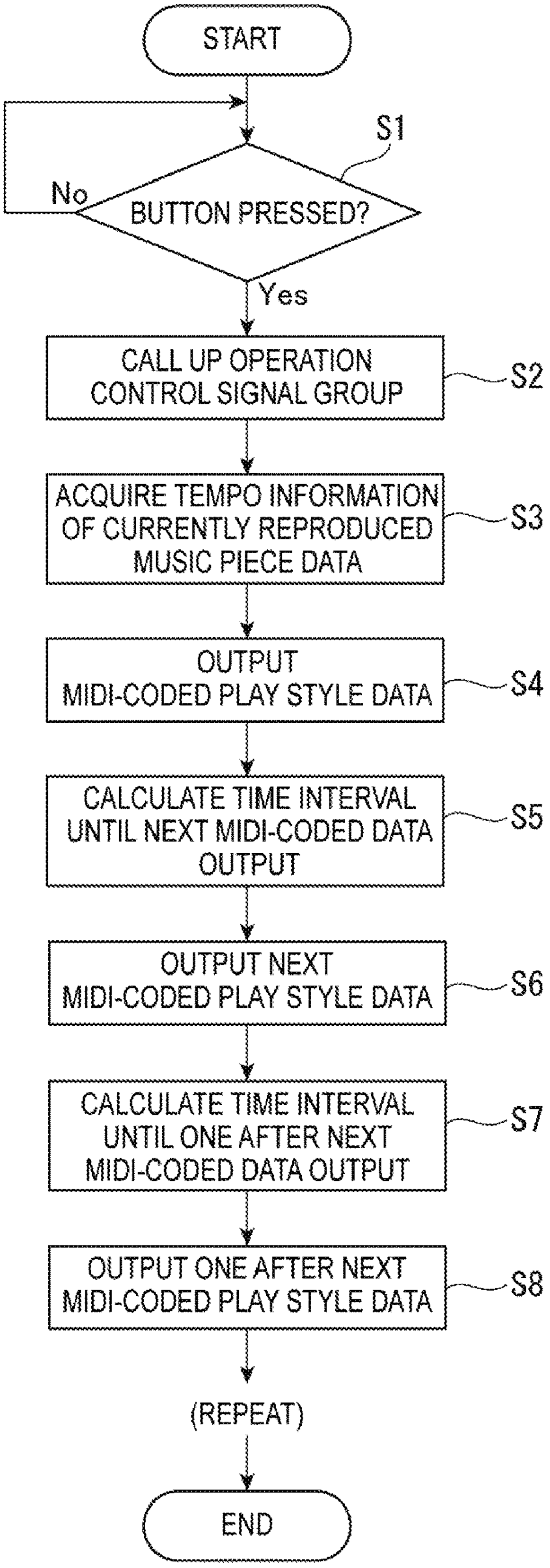
FIG. 3 is a flowchart showing workings of the exemplary embodiment.

Next, description is made on workings and effects of the invention on the basis of a flowchart shown in FIG. 3.

The operation control signal group calling section 521 monitors whether the performance pad 423 of each of the deck sections 42L and 42R is operated (step S1).

In response to an operator operating the performance pad 423, the operation control signal group calling section 521 starts a process to call up the operation control signal group of the DJ performer corresponding to the operated performance pad 423 from the operation control signal group storage 511 (step S2).

The tempo information acquiring section 522 acquires the tempo information regarding the music data inputted from the computer 2 (step S3).

The operation control signal group outputting section 523 converts the play style data of the called operation control signal group into a MIDI code and outputs the MIDI-coded play style data to the computer 2 through the USB cable 3 (step S4).

The operation control signal group outputting section 523 calculates a time interval until an output of next MIDI-coded data on the basis of the acquired tempo information and the top data in the time information that constitutes the operation control signal (step S5).

The operation control signal group outputting section 523 outputs next MIDI-coded play style data in accordance with the calculated time interval for the next MIDI-code data output (step S6), A time interval is also calculated for the one after the next (step S7) and MIDI-coded play style data is outputted after the elapse of the calculated time interval (step S8). These steps are then repeated.

The computer 2 performs special playing and/or sound effecting in accordance with the play style data outputted from the deck sections 42L and 42R to the music data on play and further performs an analog process the music data to be audibly outputted.

Such an exemplary embodiment allows the play style data of a famous DJ performer to be implemented on the DJ controller 4 simply by selecting the corresponding pad by the performance pad 423. Therefore, a high-level DJ performance can be reproduced.

With the tempo information acquiring section 522 provided, it is possible to synchronize a tempo of the play style data selected by the operator on the basis of the tempo information such as the BPM value of the music data on play. This makes it possible to play the play style data matched with the music data on play, thus allowing for playing a high-level DJ performance without uncomfortable feelings.

[4] Second Exemplary Embodiment

Next, description is made on a second exemplary embodiment of the invention. It should be noted that the same reference sign is used to refer to the same portion as the already described portion to omit the explanation thereof in the following description.

In the above-described first exemplary embodiment, with respect to the music data having been subjected to the playing process in the computer 2, the operation control signal group calling section 521 calls up the operation control signal group, which is stored in the operation control signal group storage 511, at the timing in accordance with the operation by the operator.

Figure 4:
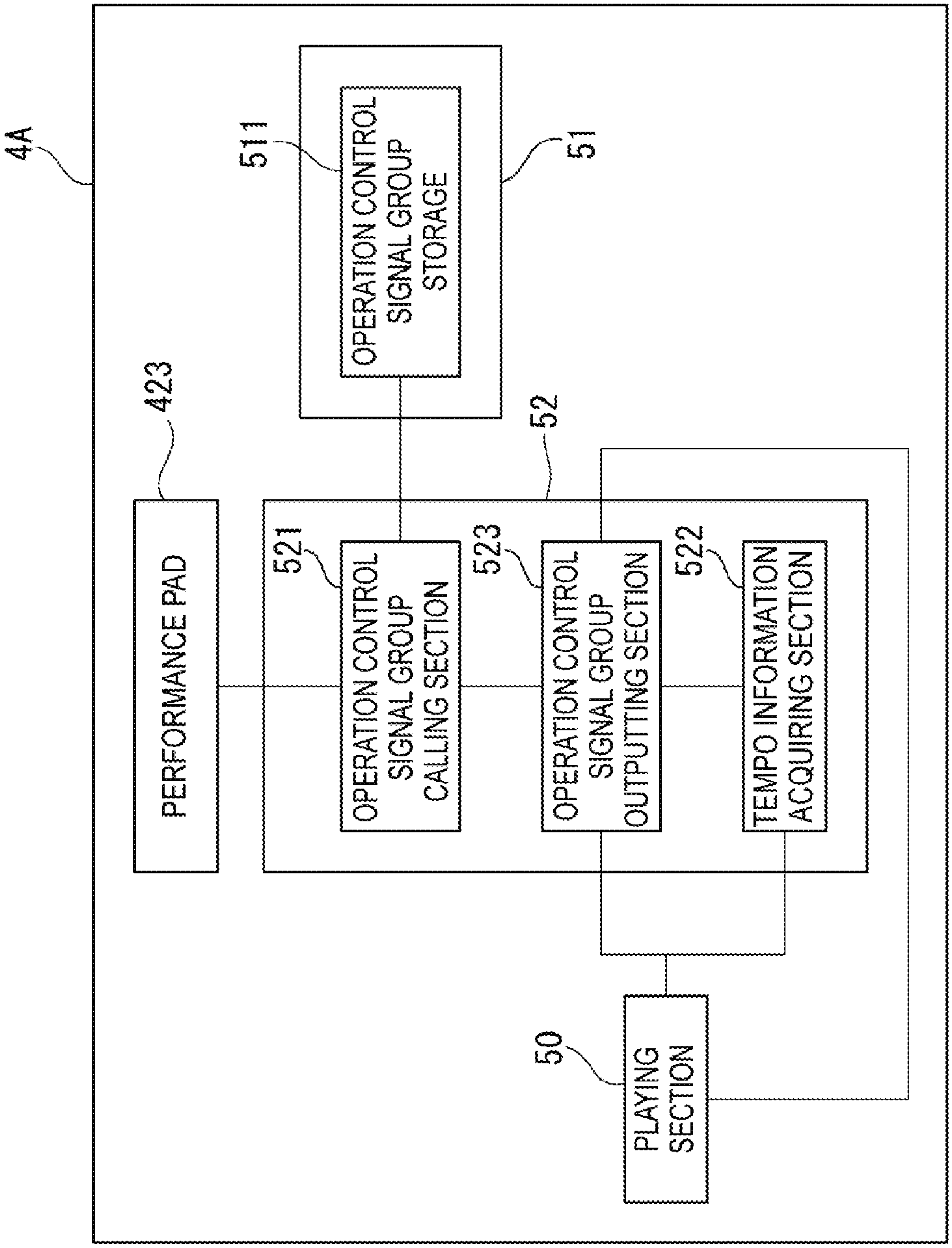
FIG. 4 is a functional block diagram showing a configuration of audio equipment according to a second exemplary embodiment of the invention.

In contrast, as shown in FIG. 4, the second exemplary embodiment is different in that a DJ player 4A, that is, audio equipment, includes a playing section 50 and the operation control signal group calling section 521 is configured to call up the operation control signal group, which is stored in the operation control signal group storage 511, with respect to the music data being played by the playing section 50 at the timing in accordance with the operation by the operator.

The DJ player 4A has an exterior configuration similar to FIG. 1 of the first exemplary embodiment and the playing section 50 is provided at a portion corresponding to each of the deck sections 42R and 42L.

The playing section 50, which is provided at the portion corresponding to each of the deck sections 42L and 42R of the first exemplary embodiment, is configured to play music data stored in a USB memory and optical disks such as a CD and a DVD.

The operation control signal group calling section 521 is configured to call up the operation control signal group at the timing in accordance with the operation by the operator.

The operation control signal group outputting section 523 is configured to convert the top data in the called operation control signal group into the MIDI code and output the MIDI-coded data to the playing section 50.

Such an exemplary embodiment also allows for enjoying workings and effects similar to the above.

[5] Modification(s) of Exemplary Embodiments

It should be noted that the invention is not limited to the above-described exemplary embodiments but includes the following modifications.

In the above-described exemplary embodiments, the playing of the music data is performed in the computer 2; however, the invention is not limited thereto. The audio equipment may execute a program which performs playing of music data or a music piece and apply the operation control signal group to the music data being played in the audio equipment.

Additionally, specific structures, shapes, etc. of the invention may be replaced by other structures, etc. insofar as an object of the invention is achievable.

EXPLANATION OF CODE(S)

1 . . . music data playing control system, 2 . . . computer, 3 . . . USB cable, 4 . . . DJ controller, 4A . . . DJ player, 41 . . . mixer section, 41E . . . effecting section, 42L . . . deck section, 42L . . . deck section, 42R . . . deck section, 43 . . . display, 50 . . . playing section, 51 . . . memory, 52 . . . CPU, 411 . . . first channel adjuster, 412 . . . second channel adjuster, 413 . . . third channel adjuster, 414 . . . fourth channel adjuster, 415 . . . microphone adjuster, 416 . . . effect selection switch, 417 . . . channel selection switch, 418 . . . effect-amount adjusting switch, 419 . . . effecting switch, 420 . . . beat changing switch, 421 . . . jog dial, 422 . . . tempo slider, 423 . . . performance pad, 424 . . . CUE button, 425 . . . pause button, 426 . . . loop button, 427 . . . deck section selection button, 428 . . . load button, 511 . . . operation control signal group storage, 521 . . . operation control signal group calling section, 522 . . . tempo information acquiring section, 523 . . . operation control signal group outputting section, S1 . . . step, S2 . . . step, S3 . . . step, S4 . . . step, S5 . . . step, S6 . . . step, S7 . . . step, S8 . . . step.

The invention claimed is:

1. Audio equipment configured to perform a special operation or an effecting on music data being played by an external device, the audio equipment comprising:

an operation control signal group storage configured to store an operation control signal group including play style data regarding the special operation or the effecting for the music data;

an operation control signal group calling section configured to call up the operation control signal group stored in the operation control signal group storage at a timing in accordance with an operation by an operator; and an operation control signal group outputting section configured to output the operation control signal group called by the operation control signal group calling section to the external device, wherein the operation control signal group includes play style data regarding the special operation or the effecting for the music data, wherein the special operation or the effecting for the music data includes at least one of a scratch operation, an echo effect, a high-speed rotary operation of a rotary operation unit, or a loop playing operation.

2. The audio equipment according to claim 1, further comprising:

a tempo information acquiring section configured to acquire tempo information regarding the music data, wherein the operation control signal group outputting section is configured to output the operation control signal group to the external device in accordance with the tempo information regarding the music data acquired by the tempo information acquiring section.

3. Audio equipment configured to perform a special operation or an effecting on music data being played, the audio equipment comprising:

a playing section configured to play the music data;

an operation control signal group storage configured to store an operation control signal group including play style data regarding the special operation or the effecting for the music data;

an operation control signal group calling section configured to call up the operation control signal group stored in the operation control signal group storage at a timing in accordance with an operation by an operator; and an operation control signal group outputting section configured to output the operation control signal group called by the operation control signal group calling section to the external device, wherein the operation control signal group includes play style data regarding the special operation or the effecting for the music data, wherein the special operation or the effecting for the music data includes at least one of a scratch operation, an echo effect, a high-speed rotary operation of a rotary operation unit, or a loop playing operation.

4. The audio equipment according to claim 3, wherein the play style data is play style data of a DJ performer.

5. The audio equipment according to claim 1, wherein the play style data is play style data of a DJ performer.

* * * * *